United States Patent [19]
Keathley et al.

[11] 3,795,970

[45] Mar. 12, 1974

[54] PROCESSES FOR EXTRUDING A PRODUCT

[76] Inventors: Anthony C. Keathley, P.O. Box 185, Pittstown, N.J. 08867; Gene L. Oberley, R. R. No. 2, Minford, Ohio 45653; Roderick J. Place, 2 Front St., Hopewell, N.J. 08525; Jack D. Stewart, 25 Oak Dr., Doylestown, Pa. 18901

[22] Filed: Jan. 23, 1973

[21] Appl. No.: 326,118

[52] U.S. Cl............................ 29/423, 72/60, 72/258, 148/11.5 F
[51] Int. Cl............................................. B21c 23/08
[58] Field of Search................... 29/423, 474.3, 475; 72/256, 257, 258, 364, 47, 60; 148/11.5 R, 11.5 F

[56] References Cited
UNITED STATES PATENTS

| | | | |
|---|---|---|---|
| 3,205,692 | 9/1965 | Kemppinen et al................ | 29/423 |
| 3,579,800 | 5/1971 | Packard............................... | 29/423 |
| 3,620,059 | 11/1971 | Nilsson................................ | 72/60 |

*Primary Examiner*—Richard J. Herbst
*Attorney, Agent, or Firm*—Popper, Bain, Bobis, Gilfillan & Rhodes

[57] ABSTRACT

Method of forming a product from a preform including a body of first predetermined material provided with a predetermined physical configuration and at least one aperture, and further including a deformable mandrel of a body of second predetermined material residing in the aperture, the mechanical properties of the second predetermined material being related predeterminedly to the mechanical properties of the first predetermined material and the first predetermined material having a predetermined volume ratio with respect to the product to be formed therefrom, and the body of second predetermined material having a predetermined volume ratio with respect to the body of first predetermined material, comprising the steps of extruding the preform through the extrusion die such that the bodies of first and second materials experience a predetermined percentage of reduction in area; subsequently annealing the extruded body of first predetermined material at a temperature and for a predetermined period of time to relieve internal stress in the body of first predetermined material caused by the extrusion, to facilitate subsequent work hardening of the body of extruded first predetermined material and to raise the elongation property of the body of extruded first predetermined material above the elongation property thereof after the extrusion; and subsequently providing work hardening to the body of extruded and annealed first predetermined material to raise the ultimate and yield strength properties of the extruded and annealed body of first predetermined material above the yield strength property thereof after the annealing.

45 Claims, 9 Drawing Figures

PATENTED MAR 12 1974 3,795,970
SHEET 1 OF 2
FIG. 1 FIG. 2 FIG. 7
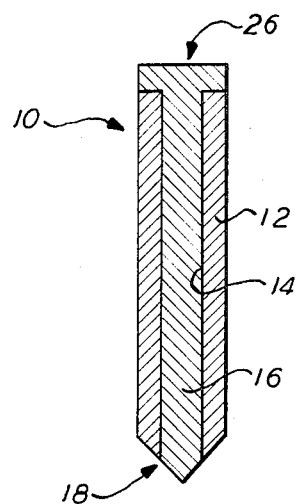
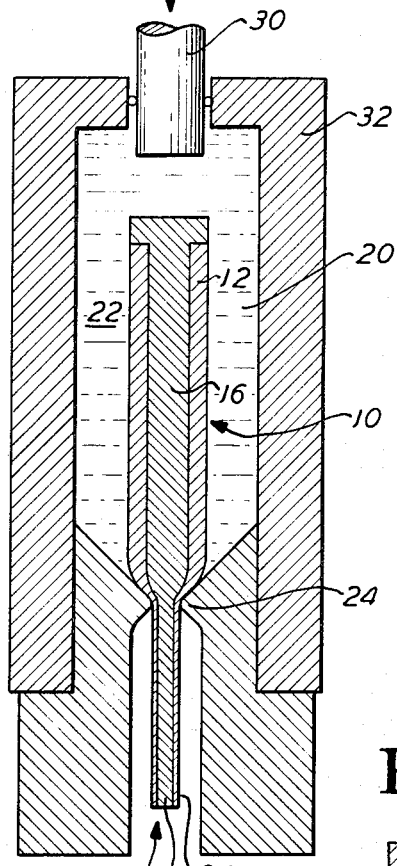
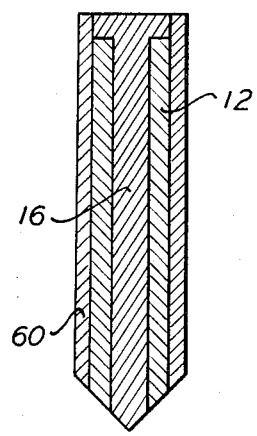
FIG. 3 FIG. 5
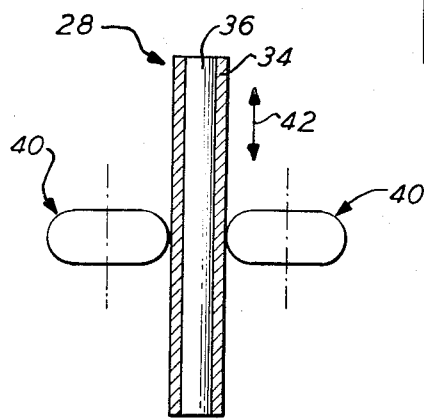
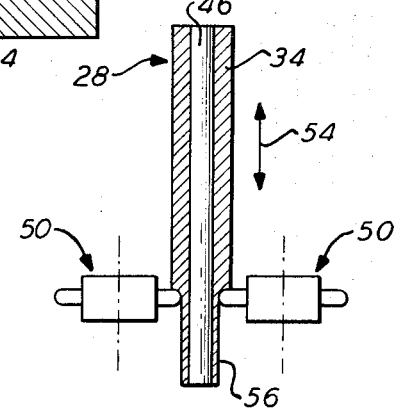
FIG. 4 FIG. 6
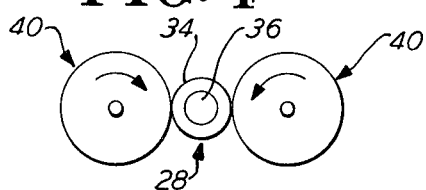
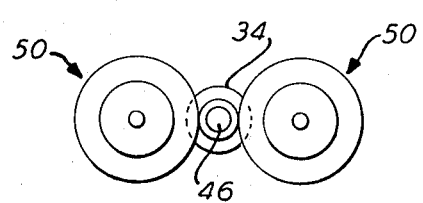

PROCESSES FOR EXTRUDING A PRODUCT

BACKGROUND OF THE INVENTION

This invention relates generally to processes for forming product from material, and more particularly to process for forming tubing. Still more particularly, this invention relates to processes especially useful in forming tubing from titanium and titanium alloys.

However, there are presently known requirements imposed, e.g., by future aircraft, which necessitate the ultimate and yield strength properties presently available with the 6Al-4V titanium alloy and which requirements would prefer the elongation properties of the 3Al-2.5V titanium alloy. A typical example of those minimum mechanical properties typically specified by present end users is set forth in Table 1 below.

TABLE 1

MINIMUM MECHANICAL PROPERTIES OF TITANIUM ALLOYS Ti-6Al-4V AND Ti-3Al-2.5V

|  | Ultimate Tensile Strength, ksi | Yield Strength at 0.2% Offset, ksi | Elongation in 2 in., % |
|---|---|---|---|
| Ti-6Al-4V (annealed) | 130 | 120 | 10 |
| Ti-3Al-2.5V (annealed) | 90 | 74 | 15 |
| Ti-3Al-2.5V (CWSR) | 125 | 105 | 10 |

Legend:
CWSR = cold work stress relieved

As is known to those skilled in the art, the need for high-quality aircraft type titanium and titanium alloy tubing is a problem familiar to all aircraft and similar type component manufacturers. User requirements for such tubing are typically defined in terms of (1) mechanical properties, i.e. ultimate tensile strength, yield strength and elongation, (2) OD and ID surface finish; (3) specific flaw limitations; (4) dimensional tolerances (diameter and wall thicknesses); (5) minimum bend radius; (6) flaring capabilities; (7) capability to withstand a specified internal pressure without yielding; and (8) flattening. The ability of the tubing to withstand specified fatigue or endurance stress is also a requirement, and since it is difficult to write this requirement into the typical procurement specification, fatigue or endurance stress requirement is typically specified by the end user.

When using conventional prior art tubing manufacturing processes, several difficulties are encountered in achieving, in particular, the requisite mechanical properties, minimum flaw allowance, and ID surface finish. Currently, production is limited to only a few suppliers and is attended by an abnormally high rejection rate typically requiring 100 percent inspection of each produced piece. Requirements 5, 6, 7, and 8, noted above, are usually satisfied if minimum mechanical requirements specified by requirement 1 are met. Achieving the dimensional tolerance requirement 4 is simply a mechanical procedure known by those skilled in the art. However, as is further known to those skilled in the art, the satisfaction of requirements 1, 2 and 3 together with fatigue or endurance stress requirement, is particularly difficult.

Titanium (generally always a titanium alloy) tubing as presently used by the aircraft industry and the related industries where high performance, reliability and anti-corrosion are necessary, consists of several basic titanium alloys, the most common ones being 3 aluminum, 2.5 vanadium titanium alloy and 6 aluminum, 4 vanadium titanium alloy, known as 3Al-2.5V titanium and 6Al-4V titanium alloys, respectively. At present, the use of titanium tubing for aircraft is essentially limited to that produced from the 3Al-2.5V titanium alloy, primarily because in tube form it is more readily available commercially than the 6Al-4V titanium alloy.

Ultimate and yield strength minimums as set forth in Table 1 above are required to minimize weight of the tubing system itself as well as to allow for the use of requisite operating pressures. This, in turn, and as known to those skilled in the art, minimizes weight for the associated components in that their size is essentially inversely proportional to the operating pressure in order to deliver a specific power requirement.

At these ultimate and yield strength levels, elongation is typically the most significant property, since elongation determines the minimum bend radius of the tubing, the extent of flaring capability, and is also fundamental with respect to the life of the tubing when subjected to fatigue or endurance stress or loadings such as vibration. Thus, a problem known to those familiar with the art is the achievement of the maximum elongation values at the ultimate and yield strength levels desired. Further, as is known to those skilled in the art, it is the desire of virtually all users and the goal of virtually all tube manufacturers to provide the highest possible elongation without sacrifice of either ultimate or yield strength.

Further, in the typical prior art extrusion or drawing of tubing, in particular seamless tubing, internal flaws and poor surface finish typically result. Further, conventional tubing manufacturing techniques, e.g. multiple stretch draws with intermediate anneals limit or adversely affect the grain texture of the tubing material such that although desired ultimate and yield strengths are usually achieved, elongation is affected adversely by such manufacturing techniques.

From the standpoint of fatigue endurance, however, the specification of strength and elongation properties only will not be sufficient. As is known to those skilled in the art, the particular ability of such tubing to withstand requisite fatigue endurance tests has been attributed primarily to the grain textures and size the tubing, and a more desirable grain texture is considered to be when the basal plane poles are perpendicular to the surface of the tubing, i.e., radial texture. For tubing with this basal plane pole orientation, burst strength is improved, and deformation during tensile test is by diameter reduction rather than wall reduction, fracture toughness is improved for flaws oriented in the axial direction, and fatigue properties are optimized. Grain texture, as is further known by those skilled in the art, may be indexed by establishing the reduction-in-diameter to the reduction-in-wall measured during the tensile test; this index is known as the strain ratio R. Since deformation should be by diameter reduction rather than wall reduction as is further known by those skilled in the art, the value of the strain ratio R should be as high as possible although acceptable values presently can only be determined empirically. For small-diameter tubing, i.e., ⅝-inch diameter and under, a strain ratio R of 0.6 minimum is typically currently recommended, for tubing over ⅝-inch diameter, a strain ratio R of 1.0 minimum is currently recommended. The above noted typical prior art processes for producing tubing, provides gain texture which is generally other than with the basal plane poles perpendicular to the surface of the tubing and hence the elongation, strain ratio R and ability of the tubing to withstand fatigue, are adversely affected.

SUMMARY

The present invention provides new and useful processes for forming product and overcomes the above-noted prior art problems.

More particularly, an embodiment of the present invention provides a new and useful process for forming tubing from a predetermined metal, e.g. titanium alloy, wherein the formed tubing has greater elongation vis-a-vis its ultimate and yield strengths than tubing formed from the same predetermined metal by prior art processes. A billet of the metal is provided with at least one aperture and a deformable mandrel of a material having mechanical properties predeterminedly related to the mechanical properties of the billet material is inserted into the aperture and the composite is extruded, for example, hydrostatically extruded. The extruded metal is annealed to raise its elongation property and is then subjected to work hardening provided uniformly across its entire thickness to raise its ultimate and yield strengths.

Further, the present invention provides new and useful processes for forming tubing with an improved ID surface finish.

Further, the processes of the present invention produce tubing having a grain texture wherein the basal plane poles are generally perpendicular to the surface of the tubing, and hence, the elongation, strain ratio R and ability of the tubing to withstand fatigue, are greatly enhanced.

In a still further embodiment of the present invention, the composite is surrounded by a predetermined material prior to extrusion to provide a predetermined volume of extrusion fluid between the walls of the extrusion chamber in which the extrusion takes place and the composite of materials so as to assure satisfactory hydrostatic extrusion.

DESCRIPTION OF THE DRAWINGS

FIG. 1 is a preform or composite according to the present invention;

FIGS. 2 through 6 are diagrammatic illustrations of various embodiments of the processes of the present invention;

FIG. 7 is another preform or composite according to the present invention; and

DESCRIPTION OF AN EMBODIMENT OF THE INVENTION

Figure 8:
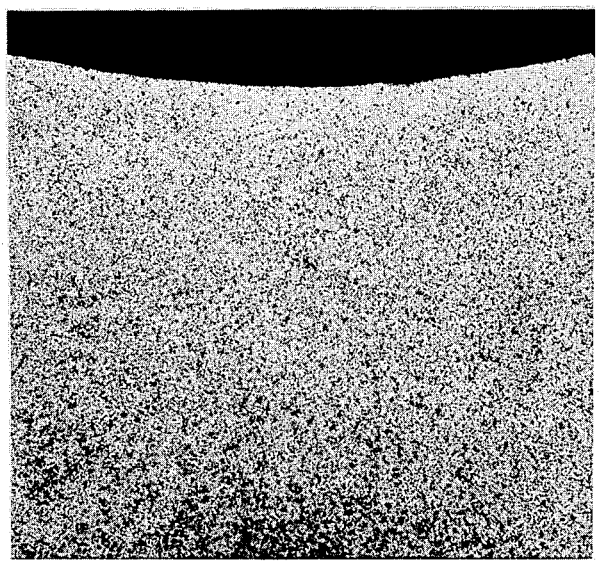
FIGS. 8 and 9 are lithographic reproductions of photomicrographs showing the grain texture of tubing walls manufactured according to the present invention and according to the prior art, respectively.

Referring now to the drawings, there is presented a diagrammatic illustration of an embodiment of the process of the present invention as it may be practiced to form a product, for example tubing, e.g. 3Al-2.5V titanium alloy tubing.

A composite or preform, identified by general numerical designation 10 in FIG. 1, is prepared including a billet 12, e.g. a billet of 3Al-2.5V titanium alloy, having an aperture 14 formed therein, and a mandrel 16 inserted into the aperture. The preform, or composite including the billet 12 and mandrel 16 is suitably provided with a generally conical configuration on the front end 18 for complementary engagement with the throat of an extrusion die. The mandrel 16 is a deformable or consumable mandrel and is chosen from a material with mechanical properties predeterminedly related to the billet 12, e.g. the mandrel material may be chosen from a material having substantially the same mechanical properties as the billet material. More particularly, since the process of the present invention requires a certain amount of cold working or reduction after extrusion to achieve specific mechanical properties required for a given application, it has been found that the deformable mandrel may be advantageously of a material with mechanical properties less in magnitude than the billet 12, in particular hardness, so as to optimize (i.e. reduce extrusion pressure without degradation of tubing ID surface finish) extrusion pressure relative to tube ID surface finish. Typical consumable mandrel materials which may be used advantageously with 3Al-2.5V titanium alloy include 1020-1035 carbon steels.

The preform or composite 10, as shown in FIG. 2, is inserted in a suitable extrusion apparatus, e.g. as shown illustratively in FIG. 2, a hydrostatic extrusion chamber 20 filled with a suitable hydrostatic extrusion medium 22, with the conical front end 18 of the preform or composite 10 placed in engagement with the thraot of an annular extrusion die 24; the front end 18 being configured conically as noted above for complementary engagement with the die throat. The ID of the billet 12 is dimensioned to be proportional to the final ID of the tubing to be formed and the ID and OD of the billet 12 are dimensioned to provide the billet with a volume of material proportional to the final dimensions of the wall thickness of the tubing to be formed as predetermined by the percentage reduction in area of the billet to be provided by the extrusion step and by any further percentage reduction in area to be provided by any subsequent process steps as taught hereinafter. The OD of the mandrel 16 is dimensioned to be substantially identical to the billet ID and is inserted, e.g. press-fitted, into the billet aperture 14. The mandrel 16 may be provided at its rear or butt end 26 with an integrally formed enlarged annular portion 28 for assuring that the downwardly acting forces applied to the preform 10 by the hydrostatic extrusion medium 22 are applied uniformly to the billet and mandrel. Depending upon the specific billet and mandrel materials involved, and the hydrostatic extrusion pressure employed, the press-fitting of the mandrel 16 into the billet aperture 14 may be sufficient to prevent the hydrostatic extrusion medium from being forced between the billet ID and mandrel OD during extrusion, which possible occurrence could prevent proper extrusion. However, to further assure the preclusion of the hydrostatic extrusion medium 22 from between the billet ID and the mandrel OD, the mandrel 16 may be bonded to the billet 12 by a suitable adhesive lubricant known to the art.

Referring again to FIG. 2, upon the advancement of the piston 30 into the extrusion chamber 20 defined by the pressure vessel 32, the hydrostatic extrusion medium 22 (e.g., a suitable oil such as castor oil, or other suitable oil) is pressurized to a predetermined pressure (e.g. 200Ksi–400Ksi for 3Al-2.5V titanium alloy billet area reductions of 80 to 90 percent) to apply hydrostatic pressure to the preform or composite 10 and to hydrostatically extrude the billet 12 and the mandrel 16 simultaneously and with equal reductions in area through the extrusion die 24 to provide the extrudant 28 which, at this stage of the process, is a length of extruded titanium alloy 34 and an inner extruded core 36; the extruded titanium alloy 34 being formed from the billet 12 and the core 36 from the deformable mandrel 16. Also, at this stage of the process, the extruded titanium alloy 34 has an ID of substantially final tubing size and OD of a predetermined size larger than the final tubing OD.

In accordance with the further practice of the described embodiment of the present invention, titanium alloy extrudant 34 is subsequently annealed at a predetermined temperature and for a predetermined period of time by a suitable annealing technique known to those skilled in the art, such as by heating in an oven or by resistance heating, to relax the titanium alloy extrudant and relieve internal stresses therein so as to facilitate removal of the extruded mandrel from the titanium alloy extrudant, to facilitate subsequent work hardening and further percentage reduction in area of the billet extrudant 34 as taught below, and to raise the elongation of the titanium alloy extrudant above the elongation thereof after the extrusion thereof. For example, in the practice of the present invention where the extrudent 34 was 3Al-2.5V titanium alloy, the annealing temperature range was 1,300°F to 1,500°F and the time range was from 1 hour to 3 hours.

Subsequent to such annealing, the titanium alloy extrudant 34 is subjected to cold working, for example, cold working such as provided by a suitable ring rolling process as shown illustratively in FIG. 3, wherein, relative movement as indicated by the arrow 42 is suitably effected between the extrudant 28 and ring rollers 40 to cause the ring rollers 40 to impart work hardening to the titanium alloy extrudant 34 sufficient to further relax the titanium alloy extrudant 34 to permit the ready removal of the extruded deformable mandrel 36, such as for example, by suitable means such as mechanical grippers. Removal of the extruded deformable mandrel 36 provides the titanium alloy extrudant 34 with an aperture smaller in size than the aperture 14 originally provided in the billet 12 due to the reduction in area provided to the billet and the deformable mandrel by the extrusion step.

A non-deformable mandrel 46 is inserted into the aperture of reduced size of the titanium alloy extrudant 34 for close accommodation therein as illustrated in FIGS. 5 and 6. The non-deformable mandrel 46 is provided with a predetermined configuration for such close accommodation and with an OD equal to, or substantially equal to, the ID of the tubing to be formed, and, the material of the non-deformable mandrel 36 is chosen to have predetermined mechanical properties related to the mechanical properties of the titanium alloy extrudant 34. More particularly, it has been found that the hardness of the non-deformable mandrel 36 may be advantageously of greater magnitude than the hardness of the titanium alloy extrudant 34 so as to provide internal support to the extruded and annealed titanium alloy extrudant 34 during any subsequent reduction in area and cold working or hardening thereof. Still more particularly, it has been found that in the practice of the present invention to form 3Al-2.5V titanium alloy tubing that the non-deformable mandrel 46 may be advantageously of a suitable tool steel.

Subsequently the extruded and annealed titanium alloy extrudant 34 is cold worked to provide work hardening to the extrudant to raise the ultimate and yield strength properties thereof above the ultimate and yield strength properties thereof after the aforementioned annealing step. Such cold working may be performed, for example, by shear spinning or rotary swaging. Further, in accordance with the teaching of the present invention, such cold working operation may impart a further percentage reduction in area to the extruded and annealed titanium alloy extrudant 34 of approximately 25 to 50 percent depending upon final ultimate and yield strength properties desired in the final titanium alloy tubing. As illustrated in FIGS. 5 and 6, such cold work operation, or imparting of work hardening and further percentage of reduction in area to the extrudant 34 may be accomplished by suitable rotatable shear spinning rollers 50 upon relative movement being suitably effected between the rollers 50 and the extrudant 34 and non-deformable mandrel 46. It will be understood by those skilled in the art that such cold working and further percentage reduction in area raises the ultimate and yield strength properties of the previously extruded and annealed extrudant 34 above the ultimate and yield strength properties thereof after such annealing operation, and, provides the titanium alloy extrudant 34 with the final OD as required by end user requirements.

If the mechanical properties, i.e. ultimate strength, yield strength and elongation, of the titanium alloy tubing 56 after the cold working operation illustrated in FIGS. 5 and 6 meet end use requirements, the tubing is ready for end use. It will be understood that the work hardening step illustrated in FIGS. 5 and 6 does not lock the non-deformable mandrel 46 in the extrudant 34, and hence, the non-deformable mandrel 46 may be readily removed by suitable mechanical means.

It will be further understood by those skilled in the art that if, after the work hardening step illustrated in FIGS. 5 and 6, the elongation property of the tubing is below end user requirements whereas the yield strength and ultimate strength properties of the tubing are above end user requirements, the tubing may be further stress relieved, such as for example for a period of 1 to 3 hours at a temperature of 600 to 1,100°F so as to raise the elongation property of the tubing to meet end user requirements. Further, if such stress relieving does not provide the required elongation, instead of such stress relieving, the tubing 56 after the work hardening and reduction in area step illustrated in FIGS. 5 and 6 may be annealed at a suitable temperature and for a suitable time, e.g. for 1 to 3 hours at a temperature of 1,100°F to 1,700°F to raise the elongation to the end use requirement. Such subsequent stress relieving or annealing must not, of course, lower the ultimate and yield strength properties of the tubing below end use requirements. Still further, if it is found that the ultimate and yield strengths of the tubing 56 do not meet end use requirements and such subsequent stress relieving or annealing after the cold working and reduction in area step illustrated in FIGS. 5 and 6, the tubing will be additionally work hardened such as by an additional shear spinning step as is illustrated in FIGS. 5 and 6. Such further shear spinning will provide a further reduction in cross-sectional area, e.g. a 25 to 50 percent further reduction in cross-sectional area of the tubing 56, and, any such further reduction in cross-sectional area will require that the original volume (OD versus ID) of the billet 12 of FIG. 1 be correspondingly and proportionally increased so as to provide the final tubing with the required OD.

Figure 9:
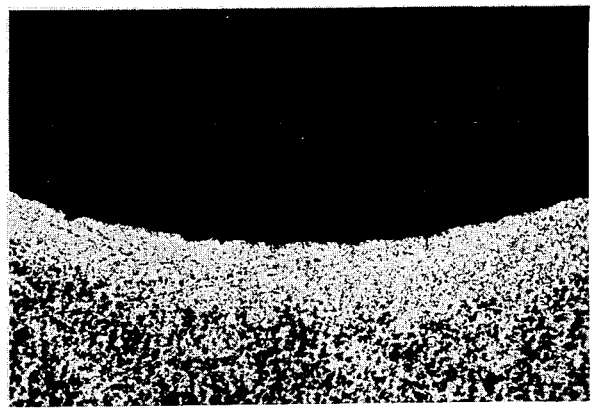

Specific mechanical properties, i.e. ultimate and yield strengths, elongation, of 3Al-2.5V titanium alloy tubing that has been formed in accordance with the present invention are set forth below in Table 2.

form and much smaller grain size (typically a grain size of 16) than tubing formed by the typical prior art processes (typically a grain size of 4–7) wherein such prior art tubing is typically produced by multiple draws with multiple intermediate anneals. More particularly, shown in FIGS. 8 and 9, respectively are lithographs of photomicrographs showing cross-sections of titanium alloy tubing formed by the process of the present invention and titanium tubing formed by such prior art processes. The finer, more uniform grain size of the tubing of the present invention, as will be further appreciated by those skilled in the art, contributes to the increased elongation property of such tubing thereby providing an increased capability for bending, flaring, flattening without fracture, and greater fatigue life or endurance, whereby, e.g. vibrations and continuous pressurization and depressurization of fluid carried by such tubing can be withstood.

Further, X-ray diffractions taken of tubing formed by the present invention reveal that the above-noted basal plane poles are more perpendicular to the surface of the tubing than those of the prior art tubing thereby indicating, as known by those skilled in the art, that the

TABLE 2

TYPICAL MECHANICAL PROPERTIES
OF TITANIUM 3Al-2.5V ALLOY TUBING
FORMED BY THE PRESENT INVENTION

| Condition | Ultimate Strength Su, KSI | Yield Strength Sy, KSI | Elongation ε, % |
|---|---|---|---|
| 25% CW | 134 | 116 | 13.8 |
| 25% CWSR | 133 | 114 | 15.0 |
| 25% CW Annealed | 78 | 75 | 20.5 |
| 50% CW | 142 | 129 | 12.4 |
| 50% CWSR | 140 | 129 | 15.3 |
| 50% CW Annealed | 82 | 73 | 29.0 |

Legend:
25% CW = 25% reduction in cross-sectional area after extrusion by cold work only
25% CWSR = 25% reduction in cross-sectional area after extrusion by cold work plus stress relief at predetermined temperature and time
25% CW Anneal = 25% reduction in cross-sectional area after extrusion by cold work plus annealing
50% CW = 50% reduction in cross-sectional area after extrusion by cold work only
50% CWSR = 50% reduction in cross-sectional area after extrusion by cold work plus stress relief
50% CW Anneal = 50% reduction in cross-sectional area after extrusion by cold work plus annealing.

It will be appreciated by those skilled in the art that a comparison of the mechanical properties of 3Al-2.5V titanium alloy tubing formed by the present invention, as set forth in Table 2, with the corresponding mechanical properties set by typical end users for 6Al-4V and 3Al-2.5V titanium alloy tubing as set forth in Table 1, will reveal that the mechanical properties that can be achieved by the present invention can satisfy all such end user requirements for either 3Al-2.5V or 6Al-4V titanium alloy tubing, particularly with regard to elongation.

Further, it has been found and will be appreciated by those skilled in the art, that the grain size of the product, e.g. titanium alloy tubing, produced by the process of the present invention is provided with a more uniform tubing of the present invention is more able to withstand fatigue than the prior art tubing.

As is still further known by those skilled in the art, the capability of titanium alloy tubing to withstand vibration and the continuous pressurization and depressurization of fluid carried by the tubing, is indicated by the strain ratio R; the strain ratio R being an index for grain or crystal orientation and that the higher the value of the strain ratio R, the more favorable is the grain or crystal orientation toward the ability of the tubing to withstand or endure fatigue. Tensile tests conducted on 3Al-2.5V titanium alloy tubing produced by the present invention showed a decrease in diameter with little or no variation in wall thickness. This was evidenced by strain ratios R varying from 2.6 to 4.0 as shown in Table 3 set forth below.

TABLE 3

STRAIN RATIO R OF TITANIUM 2Al-2.5V ALLOY TUBING OBTAINED BY THE PRESENT INVENTION

| | Sample number | | | |
|---|---|---|---|---|
| | 1 | 2 | 3 | 4 |
| Initial diameter ($D_o$), in. | 0.208 | 0.208 | 0.226 | 0.224 |
| Initial Wall Thickness ($W_o$), in. | 0.0275 | 0.0265 | 0.0325 | 0.355 |
| Final diameter ($D_f$), in. | 0.177 | 0.170 | 0.141 | 0.170 |
| Final wall Thickness ($W_f$), in. | 0.0265 | 0.0250 | 0.0285 | 0.032 |
| R | 4.4 | 3.4 | 3.6 | 2.6 |

Legend:
Strain Ratio $R = (\ln D_o/D_f)/(\ln W_o/W_f)$

Since the strain ratio values R of Table 3 exceed the strain ratio requirement R of 0.6 minimum currently recommended by current and users of titanium alloy tubing, it will be appreciated that the process of the present invention is able to achieve gain size and crystal texture which are able to provide gain and crystal orientation, in addition to the ultimate and yield strengths and elongation required by present specifications, and which grain and crystal orientations are known by those skilled in the art as being favorable toward the attainment of the ability of the tubing to withstand fatigue.

Referring now to FIG. 7, there is shown another aspect of the present invention wherein if for the satisfactory hydrostatic extrusion of the billet 12 and deformable mandrel 16 as illustrated in FIG. 2, the volume of hydrostatic fluid 22 surrounding the billet 12, when the billet OD is sized versus the billet ID to provide the billet with the proper volume ratio with regard to the wall thickness of the tubing to be formed therefrom, the billet 12 can be surrounded with a complementarily configured body of material 60 to assure the proper volume of hydrostatic fluid 22 for hydrostatic extrusion. Such materials 60 will be chosen so as to have predetermined mechanical properties relative to the mechanical properties of the material of the billet 12, e.g., the material 60 should have substantially the same, or slightly less, hardness as the material of the billet 12.

It will be further understood by those skilled in the art that many variations and modifications may be made in the present invention without departing from the spirit and scope thereof.

We claim:

1. Method of forming a product from a preform including a body of first predetermined material provided with a predetermined physical configuration and at least one aperture, and further including a deformable mandrel of a body of second predetermined material residing in said aperture, the mechanical properties of said second predetermined material being related predeterminedly to the mechanical properties of said first predetermined material, and said first predetermined material having a predetermined volume ratio with respect to said product to be formed therefrom, and said body of second predetermined material having a predetermined volume ratio with respect to said body of first predetermined material, comprising the steps of:

extruding said preform through said extrusion die such that said bodies of first and second materials experience a predetermined percentage of reduction in area;

subsequently annealing said extruded body of first predetermined material at a predetermined temperature and for a predetermined period of time to relieve internal stress in said body of first predetermined material caused by said extrusion, to facilitate subsequent work hardening of said body of extruded first predetermined material and to raise the elongation property of said body of extruded first predetermined material above the elongation property thereof after said extrusion; and subsequently providing work hardening to said body of extruded and annealed first predetermined material to raise the ultimate and yield strength properties of said extruded and annealed body of first predetermined material above the ultimate and yield strength properties thereof after said annealing.

2. Method according to claim 1 including the further step of bonding said deformable mandrel to said body of first predetermined material prior to said extrusion to assure simultaneous extrusion of said bodies of first and second predetermined materials during said extrusion.

3. Method according to claim 1 including the further step of lubricating the outer surface of said body of first predetermined material prior to said extrusion to facilitate said extrusion.

4. Method according to claim 1 wherein said predetermined annealing temperature is in the range of 1,300°F to 1,500°F.

5. Method according to claim 1 wherein said predetermined annealing period of time is in the range of 1 to 3 hours.

6. Method according to claim 1 wherein said work hardening is provided by ring rolling.

7. Method according to claim 1 wherein said work hardening is provided by shear spinning.

8. Method according to claim 1 wherein said extrusion is hydrostatic extrusion.

9. Method according to claim 8 including the further step of surrounding said body of first predetermined material of said preform with a body of third predetermined material of predetermined physical configuration prior to said hydrostatic extrusion to provide a predetermined volume of hydrostatic extrusion fluid between the wall of the extrusion chamber wherein said hydrostatic extrusion occurs and the preform including said bodies of first, second and third predetermined materials.

10. Method according to claim 1 including the further steps of providing said preform, providing a body of said first predetermined material with a predetermined physical configuration and with a predetermined volume ratio with respect to said product to be formed, and further providing said body of first predetermined material with at least one aperture;

providing a deformable mandrel from a body of second predetermined material having mechanical properties predeterminedly related to the mechanical properties of said first predetermined material, including providing said body of second predetermined material with a predetermined physical configuration for close accommodation within said aperture formed in said first body of predetermined material and with a predetermined volume ratio with respect to said body of first predetermined material; and inserting said deformable mandrel into said aperture formed in said body of first predetermined material to provide said preform.

11. Method according to claim 10 including the further step of providing one of said preform with a predetermined physical configuration for complementary engagement with the throat of said extrusion die.

12. Method according to claim 10 wherein said body of second predetermined material is provided from material having mechanical properties substantially the same as the mechanical properties of said first predetermined material.

13. Method according to claim 10 wherein said body of second predetermined material is provided from material having mechanical properties less in magnitude than the mechanical properties of said first predetermined material.

14. Method of forming a product from a preform including a body of first predetermined material provided with a predetermined physical configuration and at least one aperture, and further including a deformable mandrel of a body of second predetermined material closely residing in said aperture, the mechanical properties of said second predetermined material being related predeterminedly to the mechanical properties of said first predetermined material, and said first predetermined material having a predetermined volume ratio with respect to said product to be formed therefrom and said second material having a predetermined volume ratio with respect to said body of first predetermined material, comprising the steps of:

extruding said preform through an extrusion die to provide said first and second bodies of predetermined materials with a predetermined percentage of reduction in area;

subsequently annealing at least said extruded body of first predetermined material at a predetermined temperature and for a predetermined period of time to relieve internal stress therein caused by said extrusion, to facilitate removal of said extruded deformable mandrel from said body of extruded first predetermined material, to facilitate subsequent work hardening of said body of extruded first predetermined material, and to raise the elongation property of said body of said extruded first predetermined material above the elongation property thereof after said extrusion;

removing said deformable mandrel from said body of extruded and annealed first predetermined material whereby said extruded and annealed body of first predetermined material is provided with an aperture smaller in size that said one aperture;

inserting a non-deformable mandrel of a third predetermined material into said smaller sized aperture provided in said body of extruded and annealed first predetermined material, said non-deformable mandrel having a predetermined physical configuration for accommodation within said smaller sized aperture, and said third predetermined material having mechanical properties related predeterminedly to the mechanical properties of said first predetermined material; and providing said extruded and annealed body of first predetermined material with a predetermined percentage of reduction in area and raising the ultimate and yield strength properties of said extruded and annealed body of first predetermined material above the ultimate and yield strength properties thereof after said annealing; and removing said non-deformable mandrel from said body of first predetermined material whereby said product is formed.

15. Method according to claim 14 wherein said extrusion provides said body of first predetermined material with a predetermined percentage of reduction in area in the range of 80 to 99 percent.

16. Method according to claim 14 wherein said extruded and annealed body of first predetermined material is provided with a predetermined percentage of reduction in area in the range of 25 to 50 percent.

17. Method according to claim 14 wherein said extrusion is accomplished by hydrostatic extrusion.

18. Method according to claim 17 including the further step of surrounding said body of first predetermined material of said preform with a body of third predetermined material of predetermined physical configuration prior to said hydrostatic extrusion to provide a predetermined volume of hydrostatic extrusion fluid between the wall of the extrusion chamber wherein said hydrostatic extrusion occurs and the preform incuding said bodies of first, second and third predetermined materials.

19. Method according to claim 14 wherein said predetermined annealing temperature is in the range of 1,300° F to 1,500° F.

20. Method according to claim 14 wherein said predetermined annealing period is from 1 to 3 hours.

21. Method according to claim 14 wherein said deformable mandrel is removed from said body of extruded and annealed first predetermined material by ring rolling.

22. Method according to claim 14 wherein said extruded and annealed body of first predetermined material is provided with said predetermined percentage of reduction in area and wherein said ultimate and yield strengths of said extruded and annealed body of first predetermined material are raised by shear spinning.

23. Method according to claim 14 including the additional step of further annealing said body of first predetermined material at a predetermined temperature and for a predetermined period of time to raise the elongation thereof above the elongation thereof after said step of raising the ultimate and yield strength properties of said extruded body of first predetermined material.

24. Method according to claim 23 wherein said predetermined temperature is in the range of from 1,100°F to 1,700°F and wherein said predetermined time period is from 1 to 3 hours.

25. Method according to claim 23 including the further step of providing said body of first predetermined material with a further predetermined percentage of reduction in area and with a raising of the ultimate and yield strengths thereof above the ultimate and yield strengths thereof after said additional step of annealing.

26. Method according to claim 25 wherein said recited further step is accomplished by shear spinning.

27. Method according to claim 14 including the further step of stress relieving said body of first predetermined material to relieve at least a portion of the internal stress produced in said body of first predetermined material by said step of raising the ultimate and yield strength properties of said extruded body of first predetermined material.

28. Method according to claim 27 wherein said stress relieving step is accomplished by heating said body of first predetermined material at a temperature in the range of from 650°F to 1,100°F and for a period of time from 1 to 3 hours.

29. Method according to claim 27 including an additional cold working step for providing said body of first predetermined material with a further predetermined percentage reduction in area and with a raising of the ultimate and yield strengths thereof above the ultimate and yield strengths thereof after said step of stress relieving.

30. Method according to claim 29 wherein said additional cold working step is accomplished by shear spinning.

31. Method according to claim 14 wherein the mechanical properties of said second predetermined material are related predeterminedly to the mechanical properties of said first predetermined material by said second predetermined material being less hard than said first predetermined material.

32. Method of producing titanium alloy tubing from a preform including a billet of titanium alloy provided with a predetermined physical configuration and at least one aperture, and further including a deformable mandrel of a body of predetermined material closely residing in said aperture, said predetermined material of said deformable mandrel being less hard than said billet of titanium alloy, and said titanium alloy billet having a predetermined volume ratio with respect to said tubing to be formed therefrom and said deformable material having a predetermined volume ratio with respect to said billet of titanium alloy, comprising the steps of:

hydrostatically extruding said preform through an extrusion die to provide said billet of titanium alloy and said deformable mandrel with a predetermined percentage of reduction in area;

subsequently annealing at least said extruded billet of titanium alloy at a predetermined temperature and for a predetermined period of time to relieve internal stress therein caused by said extrusion, to facilitate removal of said extruded deformable mandrel therefrom, to facilitate subsequent work hardening and further percentage of reduction in area of said extruded billet of titanium alloy, and to raise the elongation property of said extruded billet of titanium alloy above the elongation property thereof after said extrusion;

ring rolling said extruded and annealed billet of titanium alloy to provide relaxation of said extruded and annealed titanium alloy billet about said extruded deformable mandrel to permit removal of said deformable mandrel from said extruded and annealed billet of titanium alloy;

removing said deformable mandrel from said extruded and annealed titanium alloy billet whereby said extruded and annealed titanium alloy billet is provided with an aperture smaller in size than said one aperture;

inserting a non-deformable mandrel of a second predetermined material into said smaller sized aperture provided in said extruded and annealed titanium alloy billet, said non-deformable mandrel having a predetermined physical configuration for close accommodation within said smaller sized aperture, and said second predetermined material of said non-deformable mandrel being of a greater hardness than the hardness of said extruded and annealed titanium alloy billet so as to provide internal support to said extruded and annealed titanium alloy billet during subsequent reduction in area and cold working thereof;

cold working said extruded and annealed billet of titanium alloy supported internally by said non-deformable mandrel to provide said extruded and annealed titanium alloy billet with a predetermined percentage of reduction in area and to raise the ultimate and yield strength properties of said extruded and annealed billet of titanium alloy above the ultimate and yield strength properties thereof after said annealing; and removing said non-deformable mandrel from said extruded, annealed and cold worked billet of titanium alloy whereby said titanium alloy tubing is formed.

33. Method according to claim 32 wherein said hydrostatic extrusion provides said billet of titanium alloy with a predetermined percentage of reduction in area in the range of 80 to 99 percent.

34. Method according to claim 32 wherein said cold working provides said extruded and annealed billet of titanium alloy with a predetermined percentage of reduction in area in the range of 25 to 50 percent.

35. Method according to claim 32 wherein said predetermined annealing temperature is in the range of 1,300°F to 1,500°F. and wherein said predetermined anealing period is from 1 to 3 hours.

36. Method according to claim 32 wherein said cold working is provided by shear spinning.

37. Method according to claim 32 including the further step of surrounding said preform including said billet of titanium alloy and said deformable mandrel with a body of second predetermined material of predetermined physical configuration prior to said hydrostatic extrusion to provide a predetermined volume of hydrostatic extrusion fluid between the wall of the extrusion chamber wherein said hydrostatic extrusion occurs and said preform and surrounding body of second predetermined material.

38. Method according to claim 32 including the additional step of further annealing said titanium alloy tubing at a predetermined temperature and for a predetermined period of time to raise the elongation thereof above the elongation thereof after said cold working step of raising the ultimate and yield strength properties of said titanium alloy tubing.

39. Method according to claim 38 wherein said predetermined temperature is in the range of from 1,100°F to 1,700°F and wherein said predetermined time period is from 1 to 3 hours.

40. Method according to claim 38 including the additional step of further cold working said titanium alloy tubing to provide said tubing with a further predetermined percentage of reduction in area and to raise the ultimate and yield strengths thereof to a predetermined level above the ultimate and yield strengths thereof after said additional annealing step.

41. Method according to claim 40 wherein said recited additional cold working step is accomplished by shear spinning.

42. Method according to claim 32 including the additional step of stress relieving said titanium alloy tubing to relieve at least a portion of the internal stress produced therein by said cold working step.

43. Method according to claim 42 wherein said stress relieving step is accomplished by heating said titanium alloy tubing to a temperature in the range of from 650°F to 1,100°F for a period of time in the range of 1 to 3 hours.

44. Method according to claim 42 including the additional step of further cold working said titanium tubing to provide said tubing with a further predetermined percentage of reduction in area and to raise the ultimate and yield strengths of said tubing above the ultimate and yield strengths thereof after said stress relieving step.

45. Method according to claim 44 wherein said additional cold working step is accomplished by shear spinning.

* * * * *